Aug. 17, 1954  H. E. TEMPLE  2,686,589
CURVED CONVEYER
Filed Oct. 13, 1952
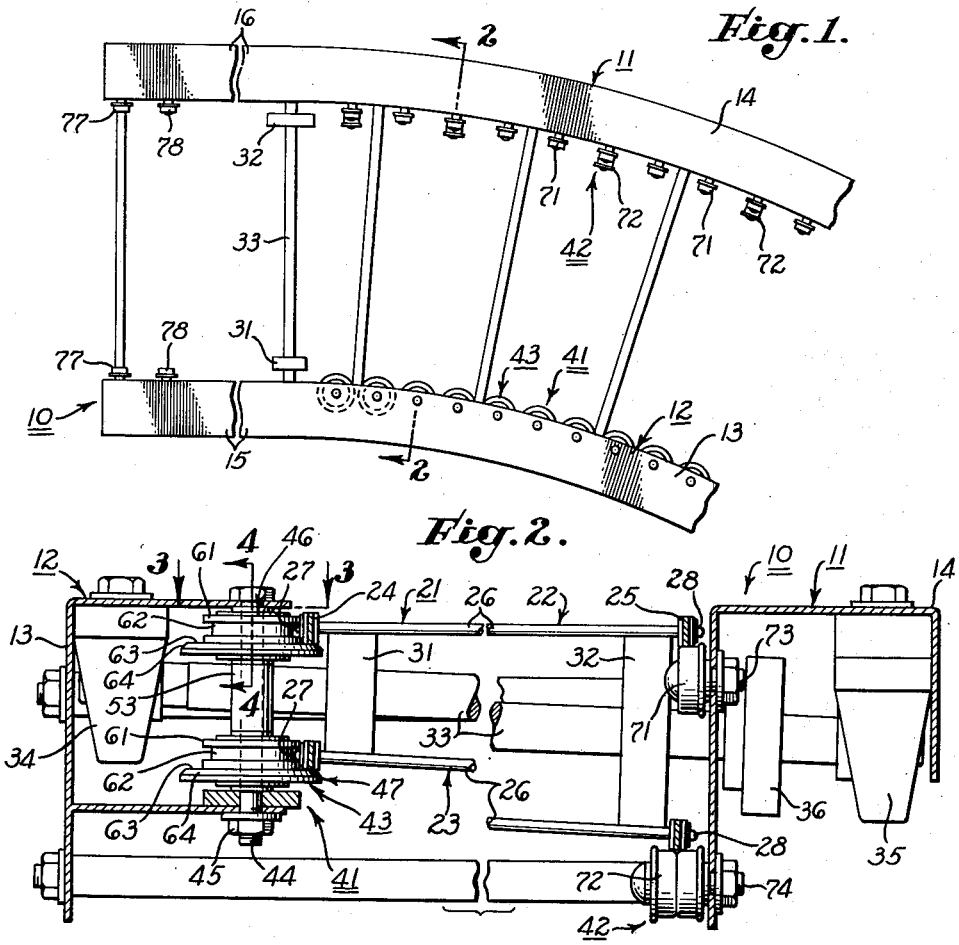
INVENTOR.
HIRAM E. TEMPLE
BY HIS ATTORNEYS.
HARRIS, KIECH, FOSTER & HARRIS
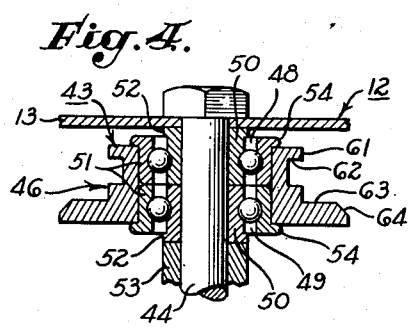

Patented Aug. 17, 1954

2,686,589

UNITED STATES PATENT OFFICE 2,686,589

CURVED CONVEYER

Hiram E. Temple, San Gabriel, Calif., assignor to Read Standard Corporation, a corporation of Delaware Application October 13, 1952, Serial No. 314,471

5 Claims. (Cl. 198—182)

The present invention relates in general to conveyors and, more particularly, to curved conveyors, a primary object of the invention being to provide an improved guide means for supporting a curved conveyor and for guiding it along its curved path.

An important object of the invention is to provide a conveyor structure wherein the curved conveyor is guided and supported entirely by a plurality of roller means to minimize friction and thus minimize the power required to drive the conveyor, there being no sliding engagement between the conveyor and the guide means therefor.

Another object is to provide inner and outer guide means on a supporting frame and respectively engaging the inner and outer edges of the conveyor for supporting the conveyor and for guiding it along its curved path.

Another object is to provide an inner guide means which includes a plurality of roller means rotatable about axes generally perpendicular to the conveyor, the roller means including cylindrical surfaces engaging the inner edge of the conveyor to oppose the radially inward thrust produced by the curve in the conveyor, and including annular supporting surfaces generally perpendicular to the cylindrical surfaces and extending outwardly therebeyond for supporting the conveyor.

Another object is to provide an outer guide means for the conveyor which includes a plurality of roller means rotatable about axes extending generally radially of the curve of the conveyor.

Another object is to provide a conveyor which comprises inner and outer chains connected by rods extending therebetween, the rods projecting inwardly through the inner chain and the cylindrical surfaces of the roller means of the inner guide means having therein annular grooves to receive the inwardly projecting rod ends so as to lock the conveyor on its path.

Another object is to provide a conveyor structure wherein the curved conveyor has upper and lower runs and wherein similar guide means are provided for both runs. However, it will be understood that the invention is not necessarily limited to a conveyor having superimposed upper and lower runs since the invention may also be incorporated in a conveyor wherein the return run follows an entirely different path. For example, the invention may be embodied in a helical conveyor, or elevator, wherein the return run follows a different path. Also, the invention may be embodied in a conveyor which describes a complete circle, other possibilities also existing.

The foregoing objects and advantages of the present invention, together with various other objects and advantages thereof which will become apparent, may be attained with the exemplary embodiment of the invention which is illustrated in the accompanying drawing and which is described in detail hereinafter. Referring to the drawing:

Fig. 1 is a fragmentary plan view of a conveyor structure showing a frame and inner and outer guide means for a curved conveyor, the conveyor itself not being shown for purposes of clarity;

Fig. 2 is a fragmentary sectional view on an enlarged scale which is taken along the arrowed line 2—2 of Fig. 1 and in which the curved conveyor is shown in its operating position; and Figs. 3 and 4 are fragmentary sectional views on further enlarged scales and respectively taken along the arrowed lines 3—3 and 4—4 of Fig. 2.

Referring to the drawing, the conveyor structure illustrated therein includes a frame 10 comprising rails 11 and 12 respectively including inner and outer curved sections 13 and 14 and respectively including straight rail sections 15 and 16. As best shown in Fig. 2, the rail section 13 comprises an outwardly facing channel and the rail section 14 comprises a downwardly facing channel.

The conveyor structure includes a curved conveyor 21 which is movable along the curved path defined by the inner and outer curved rail sections 13 and 14, the conveyor 21 having superimposed upper and lower runs 22 and 23 in the particular construction shown, although other arrangements may be employed, as hereinbefore pointed out. The conveyor 21 includes inner and outer chains 24 and 25 which are composed of individual links pivotally connected together by rods 26 which extend between the chains and which extend therethrough to provide inwardly projecting inner ends 27 and outwardly projecting outer ends 28. The links of which each chain is formed are best shown in Fig. 3 of the drawing.

The curved conveyor 21 is trained at one end around inner and outer sprockets 31 and 32 which are fixed on a shaft 33 carried by bearings 34 and 35 mounted on the curved rail sections 13 and 14, respectively. Since the conveyor 21 of necessity diverges outwardly from the center of the conveyor curve, the diameter of the outer sprocket 32 exceeds that of the inner sprocket 31, these sprockets having teeth, not shown, thereon between which the rods 26 are disposed. In other words, the sprockets 31 and 32 mesh with the rods 26 of the conveyor 21 to drive the conveyor, the shaft 33 on which the sprockets 31 and 32 are mounted being driven through a drive sprocket 36 thereon which may be driven in any suitable manner, not shown.

The conveyor structure includes inner and outer guide means 41 and 42 which respectively engage the inner and outer edges of the conveyor 21 to guide and support it. Considering the inner guide means 41 first, it includes a plurality of roller means 43 on the inner curved rail section 13 and spaced apart along the inner edges of the upper and lower runs 22 and 23 of the conveyor 21, the roller means 43 being rotatable about axes which are generally perpendicular to the conveyor. In the particular construction illustrated, the upper and lower runs 22 and 23 of the conveyor are generally horizontal so that the axes of the roller means 43 are generally vertical.

Each roller means 43 includes a shaft 44 which spans the channel-shaped inner curved rail section 13 and which extends through the flanges thereof, the shafts 44 being simple bolts in the particular construction illustrated and being retained by nuts 45. Each roller means includes upper and lower rollers 46 and 47 respectively engageable with the inner edges of the upper and lower runs 22 and 23 of the conveyor 21, i. e., respectively engageable with the upper and lower runs of the inner chain 24. Referring to Fig. 4 in particular, the upper roller 46 is tubular and has pressed thereinto two ball bearings 48 and 49 each having inner and outer races 50 and 51. The inner races 50 are oppositely oriented on the corresponding shaft 44 and have axial extensions 52 which respectively space the bearings 48 and 49 from the upper flange of the channel-shaped rail section 13 and from a tubular spacer 53 between the upper and lower rollers 46 and 47. The outer races 51 of the bearings 48 and 49 are also oppositely oriented and have at their outer ends annular beads 54 which limit insertion of the bearings 48 and 49 into each upper roller 46.

Each upper roller 46 has a cylindrical surface 61 which is engageable by the upper run of the inner chain 24 to oppose the radially inward thrust produced by the curve in the conveyor 21, this surface having an annular groove 62 therein to receive the projecting inner ends 27 of the rods 26, so as to lock the conveyor 21 on its path. The upper run of the inner chain 24 is supported by annular supporting surfaces 63 which are generally perpendicular to and extend outwardly beyond the respective cylindrical surfaces 61, the upper run of the inner chain 24 resting on these supporting surfaces so that the latter support the inner edge of the upper run 22 of the conveyor 21. The outer periphery of the annular supporting surface 63 of each upper roller 46 is beveled, as indicated at 64, to permit the upper run of the inner chain 24 to move onto and off each annular supporting surface readily. The lower rollers 47 are identical to the upper rollers 46 and are mounted on bearings in the same way so that they will not be discussed in detail. As will be apparent, the lower rollers 47 support the inner edge of the lower run 23 of the conveyor 21 in the same manner as the upper rollers 46 support the inner edge of the upper run.

Considering the outer guide means 42, it includes a plurality of single upper rollers 71 and a plurality of double lower rollers 72 respectively supporting the upper and lower runs of the outer chain 25, the upper and lower rollers 71 and 72 respectively being rotatable on shafts 73 and 74 which are preferably ordinary bolts secured to the inner flange of the downwardly facing, channel-shaped outer rail section 14. The shafts 73 and 74 extend generally radially of the curve defined by the conveyor 21 and toward the center of such curve.

As indicated in Fig. 1, the conveyor structure may include a straight section defined by the straight rail sections 15 and 16, each of these rail sections carrying upper and lower rollers 77 and 78 respectively adapted to guide and support upper and lower runs of a straight conveyor, not shown, similar to the curved conveyor 21, each of the upper and lower rollers 77 and 78 being similar to one of the rollers 71.

The roller means 43 of the inner guide means 41 provide an effective means of guiding and supporting the inner edges of the upper and lower runs 22 and 23 of the conveyor 21 with a minimum of friction, and yet are of simple construction, which is an important feature of the invention. Each run of the inner chain 24 is supported both against vertical loads and inward radial thrust loads by the simple roller means 43, which is an important feature.

Although I have disclosed an exemplary embodiment of my invention herein for purposes of illustration, it will be understood that various changes, modifications and substitutions may be incorporated in such embodiment without departing from the spirit of the invention.

I claim as my invention:

1. In combination: a frame; a curved conveyor carried by and movable relative to said frame along a curved path and having inner and outer edges respectively extending along the inside and outside of said curved path; and inner and outer guide means on said frame and engaging said conveyor along said inner and outer edges thereof, respectively, for supporting said conveyor and for guiding it along said curved path, said inner guide means including a plurality of roller means on said frame and spaced apart along said inner edge of said conveyor and rotatable about axes generally perpendicular to said conveyor, said roller means having cylindrical surfaces engaging said inner edge of said conveyor to oppose the radially inward thrust produced by the curve in said conveyor, and having annular supporting surfaces generally perpendicular to said cylindrical surfaces and projecting outwardly therebeyond and engaging one side of said conveyor adjacent said inner edge thereof to support said conveyor.

2. The combination defined in claim 1 wherein said outer guide means includes a plurality of rollers means on said frame and spaced apart along said outer edge of said conveyor and rotatable about axes extending generally radially of the curve in said conveyor, the roller means of said outer guide means having cylindrical surfaces engaging one side of said conveyor adjacent said outer edge thereof to support said conveyor.

3. The combination defined in claim 1 wherein said conveyor includes inner and outer chains and rods extending between and connected to said chains, the inner ends of said rods projecting through said inner chain, said cylindrical surfaces having annular grooves therein to receive the projecting inner ends of said rods.

4. The combination defined in claim 1 wherein said conveyor is provided with upper and lower runs each having inner and outer edges, the plurality of roller means defined in claim 1 being spaced apart along the inner edge of one of said runs, and said combination including another, identical plurality of roller means spaced apart along said inner edge of the other of said runs and having the same relation thereto.

5. The combination defined in claim 1 wherein said annular supporting surfaces are provided with beveled outer peripheries.

References Cited in the file of this patent

UNITED STATES PATENTS

| Number | Name | Date |
| --- | --- | --- |
| 2,592,898 | Helberg | Apr. 15, 1952 |